2,773,772
Patented Dec. 11, 1956

2,773,772

METHOD OF IMPARTING A BUTTER-LIKE FLAVORING TO FAT-CONTAINING FOOD PRODUCTS AND THE RESULTING PRODUCT

Dwight R. Merker, Chicago, Ill., assignor to Swift & Company, Chicago, Ill., a corporation of Illinois No Drawing. Application March 12, 1954,
Serial No. 415,973

21 Claims. (Cl. 99—123)

The present invention relates generally to a process whereby a butter-like flavor may be imparted to fat-containing food products. More particularly, this invention is concerned with a process whereby a mild butter-like flavor is introduced into oleomargarine, peanut butter, frozen desserts and similar fat-containing food products. The flavor obtained is sufficiently stable to make possible the retention of the product on dealers' shelves or in the hands of the consumer for relatively long periods of time before use.

It has been a practice for some time to impart a butter-like flavor to fat-containing food products, for example, oleomargarine, peanut butter and frozen desserts, by the simple addition of diacetyl and butyric acid salts. This is necessary as edible fats, being highly purified, are of a bland nature and, if unflavored, result in an uninteresting product from a taste standpoint.

The most commonly used of these additives, diacetyl, is objectionable in that if used in excess, it imparts an exceptionally strong taste to the product. Further, unless the food product is immediately used, it has been found that the flavor may rapidly fade. When butyric acid or its salts are employed, considerable care must be exercised as an excess of the free acid can result in a product having the taste and odor of cheese or of rancid butter. Additionally, butyric acid is objectionable for some of the same reasons mentioned above relative to diacetyl; the flavor imparted tends to fade after the passage of a reasonably short period of time and may be undesirably strong initially.

It is therefore an object of this invention to provide a method whereby a butter-like flavor may be secured in fat-containing food products, which flavor, however, does not exhibit the usual tendency to fade after the passage of several weeks time.

A further object is to provide such a process and product whereby the butter-like flavor is mild and at no time resembles that of a rancid fat.

Other objects and advantages in the invention will become apparent in the course of the discussion below.

This invention is the result of a discovery that a small amount of certain butyl alcohols, in particular normal butyl alcohol and isobutyl alcohol when used alone or when combined with minute amounts of diacetyl, have the ability to impart a mild butter-like flavor to fat-containing food products of the oleomargarine, peanut butter and frozen dessert type. The alcohol is added to the fat while the latter is in a liquid state. That is, the alcohol is preferably admixed with a liquid fat prior to mixing such fatty material with the remainder of the food product ingredients. If the entire product is initially of a fatty nature, oleomargarine for example, it may be simply liquefied, the diacetyl and alcohol or alcohol alone added thereto and after suitable mixing, the fat solidified. When diacetyl is used in conjunction with butyl alcohol, the quantity of diacetyl required may be reduced to a level considerably below that normally employed. However, butyl alcohol itself has the ability to impart a mild butter-like flavor even if employed without the generally used diacetyl. In either event, butanol provides a stable flavor and tends to mask or suppress the typical odor and flavor which arises from fat deterioration—a phenomenon which is observed even when substantial amounts of diacetyl are employed.

Preferably, 25 to 50 parts butanol are mixed with about 1 part diacetyl and about 50 parts of this mixture per million parts fat are admixed with the liquefied fatty material. The proportions of butanol to diacetyl may vary over a relatively wide range, the 25–50 to 1 ratio given above being about optimum. However, anywhere between 5 and 200 parts butanol to 1 to 40 parts of the diacetyl are effective. The quantity of the flavoring mixture added to the food product is, of course, a function of the amount of fat present relative to the total quantity of the product. Again, the amount required may vary rather widely. Anywhere between 5 and 200 parts butanol, or of the butanol-diacetyl mixture, per million parts fat have been successfully used in various food substances. In the case of the frozen desserts, it has been found that about 25 parts per million based on the fat present is usually effective to provide the desired flavor. The product resulting has a mild flavor and exhibits flavor and odor stability for a period of several weeks.

As is clear from the above discussion, the minute amounts of the flavoring materials used make desirable the use of a carrier. Propylene glycol or glycerine have been found most suitable. Preferably, a saturated solution of butyl alcohol and diacetyl (or alcohol alone) in the carrier is formed and the solution mixed with the fat in the proper proportions.

Specific examples showing the process whereby a butter-like flavor is imparted to a fat containing food product by application of the principles of the instant invention are set out below:

*Example I*

A mixture of 500 g. of butanol, 20 g. of diacetyl and 530 g. of glycerol was prepared. One hundred twenty milliliters of the mixture was added to 3000 pounds of margarine just prior to subjecting the latter to the churning operation. The margarine was then chilled and prepared for consumption in the usual fashion. It was found to possess a mild butter-like flavor and retained such flavor as long as the product was stored under normal conditions.

*Example II*

Twenty-five milliliters of the mixture described in Example I were added to 120 lbs. of cultured skim milk. Salt and sodium benzoate were also admixed with the milk in the usual fashion. The ripened milk was then mixed with lecithin and vitamin treated fat and the two commingled in an agitation tank to form a loose emulsion. As in Example I, the product was then chilled and prepared for use.

Further modifications in the taste to suit individual preferences may be secured by adding traces (.01 to 1.0%) of butyl butyrate, butyl acetate, ethyl butyrate, isobutyraldehyde or butyric acid to the butanol or butanol-diacetyl mixture. These may be added individually or, if desired, in combination with one another depending on the particular flavor desired. The normal ethyl, propyl and butyl esters of lactic acid may also be admixed with the fatty product.

In all events, whether these last named additives are employed and whether or not a small amount of diacetyl is also used, butyl alcohol must be employed as it is this substance which has the ability both to impart a mild and stable butter-like flavor and to mask and suppress the objectionable flavor and odor that accompanies fat deterioration.

Obviously, many modifications and variations of the invention as hereinbefore set forth may be made without departing from the spirit and scope thereof, and therefore only such limitations should be imposed as are indicated in the appended claims.

I claim:

1. A method of stabilizing the butter-like flavor of fat-containing food products having incorporated therein a small amount of diacetyl which comprises: adding thereto a small amount of butyl alcohol.

2. A fat-containing food composition characterized by its mild butter-like flavor and its resistance to flavor and odor reversion comprising: a fat-containing food product and at least about one part per million diacetyl and a small amount less than about 200 parts per million butyl alcohol by weight based upon the total fat present.

3. A method of stabilizing the butter-like flavor of fat-containing food products having incorporated therein a small amount of diacetyl which comprises: adding thereto between about 5 and 100 parts butyl alcohol for each part diacetyl present in said fat-containing product.

4. A method of imparting a butter-like flavor to fat-containing food products which comprises: adding thereto a small amount up to 40 parts diacetyl per million parts fat in said food product together with a small amount less than about 200 parts butyl alcohol per million parts of fat in said food product.

5. A method of imparting a butter-like flavor to fat-containing food products which comprises: adding thereto butyl alcohol in a perceptible amount less than about 200 parts per million parts of fat present in said food product.

6. A method of imparting a butter-like flavor to fat-containing food products which comprises: adding thereto a small amount of butyl alcohol.

7. A fat-containing food product having as a flavoring ingredient therein small amounts of diacetyl and butyl alcohol.

8. A fat-containing food product having as a flavoring ingredient therein a small amount of butyl alcohol.

9. A method of imparting a butter-like flavor to oleomargarine which comprises: adding thereto a small amount of butyl alcohol.

10. A method of imparting a butter-like flavor to oleomargarine which comprises: adding thereto small amounts of butyl alcohol and diacetyl.

11. A method of imparting a butter-like flavor to oleomargarine which comprises: liquefying said oleomargarine; adding thereto a small amount of butyl alcohol; and thereafter solidifying said alcohol treated margarine.

12. A method of imparting a butter-like flavor to fat-containing food products which comprises: liquefying a fatty material, adding thereto a small amount of butyl alcohol; and subsequently adding said alcohol treated fat to said food product.

13. A method of imparting a butter-like flavor to fat-containing food products which comprises: adding thereto a small amount of a mixture comprising normal butyl alcohol and diacetyl.

14. A method of imparting a butter-like flavor to fat-containing food products which comprises: adding thereto a small amount of normal butyl alcohol.

15. A method of stabilizing the butter-like flavor of a fat-containing food product having incorporated therein a small amount of diacetyl which comprises: adding thereto between about 25 and about 50 parts butyl alcohol for each part diacetyl present in said food product.

16. A fat-containing food composition characterized by its mild butter-like flavor and its resistance to flavor and odor reversion comprising: a fat-containing food product and about 50 parts of a mixture of butyl alcohol and diacetyl per million parts by weight of the fat present in said food product, said butyl alcohol and diacetyl being present in a ratio of between about 25 and about 50 parts butyl alcohol to each part diacetyl.

17. A method of imparting a butter-like flavor to fat-containing food products which comprises: adding thereto about 50 parts of a mixture of butyl alcohol and diacetyl per million parts by weight of fat present in said food product, said butyl alcohol and diacetyl being present in a ratio of between about 25 and about 50 parts butyl alcohol to each part diacetyl.

18. A method of imparting a butter-like flavor to fat-containing food products which comprises: adding thereto between about 25 and about 50 parts by weight butyl alcohol per million parts fat present in said food product.

19. A method of stabilizing the butter-like flavor of diacetyl which comprises: admixing therewith about 25 to about 50 parts by weight of butyl alcohol for each part diacetyl.

20. A fat-containing food product having as a flavoring ingredient therein between about 25 and about 50 parts by weight butyl alcohol per million parts fat present in said food product.

21. A composition suitable for imparting a butter-like flavor to fat containing food products comprising: between about 25 and about 50 parts by weight butyl alcohol for each part diacetyl.

References Cited in the file of this patent

UNITED STATES PATENTS

| 983,854 | Yeoman | Feb. 7, 1911 |
| 1,384,680 | Smith et al. | July 12, 1921 |
| 1,945,347 | Epstein et al. | Jan. 30, 1934 |

OTHER REFERENCES

"The Chemical Senses," by Moncrieff, Leonard Hill Limited, 17 Stratford Place, W. 1, London, 1944, page 181.